Sept. 20, 1938.   A. H. OELKERS ET AL   2,130,674
FREIGHT CAR TRUCK SNUBBER
Filed July 31, 1935   6 Sheets-Sheet 4

INVENTORS
Alfred H. Oelkers
Fred E. Bachman
ATTORNEYS.

Sept. 20, 1938.　　　A. H. OELKERS ET AL　　　2,130,674

FREIGHT CAR TRUCK SNUBBER

Filed July 31, 1935　　　6 Sheets-Sheet 5

INVENTORS
Alfred H. Oelkers
Fred E. Bachman
By Orin O. Farnee ATTORNEYS.

Patented Sept. 20, 1938

2,130,674

UNITED STATES PATENT OFFICE 2,130,674

FREIGHT CAR TRUCK SNUBBER

Alfred H. Oelkers and Fred E. Bachman, Chicago, Ill., assignors to American Steel Foundries, Chicago, Ill., a corporation of New Jersey Application July 31, 1935, Serial No. 34,037

17 Claims. (Cl. 267—9)

This invention relates generally to railway car trucks and more particularly to a bolster supporting spring grouping arranged to prevent the development of excessive oscillations.

An object of the invention is to provide a novel friction absorbing means in association with the spring group in a car truck, particularly to prevent harmonic vibrations in such a load supporting spring group.

A further object of our invention is to provide such a snubbing device in a form which may be readily adapted for varying loads which may be carried by the spring group of which it forms a part.

Yet another object contemplated by our invention is the provision of a friction absorbing device of such a design that the frictional absorption may be easily altered to suit varying conditions by the simple interchange of similar parts.

Still another object contemplated by our invention is the provision of such a device in a very compact form, thereby adapted to meet the space requirements in modern railway trucks.

A still further object of our invention is to provide a relatively simple and economical snubbing device for railway car trucks in a form which will have maximum wearing life.

Still another object contemplated by our invention is the provision of such a friction absorbing device in a form wherein the friction absorption will remain practically constant throughout its period of use; in other words, a friction absorbing device whose efficiency will not be lessened after a long period of use and whose frictional absorption will remain substantially constant throughout its life.

Our invention is an improvement on the truck construction shown in the present pending patent application identified as Serial No. 740,283, A. H. Oelkers, filed August 17, 1934.

With these and various other objects in view, the invention may consist of certain novel features of construction and operation as will be more fully described and particularly pointed out in the specification, drawings, and claims appended hereto.

In the drawings which illustrate embodiments of our invention and wherein like reference characters are used to designate like parts—

Figure 1:
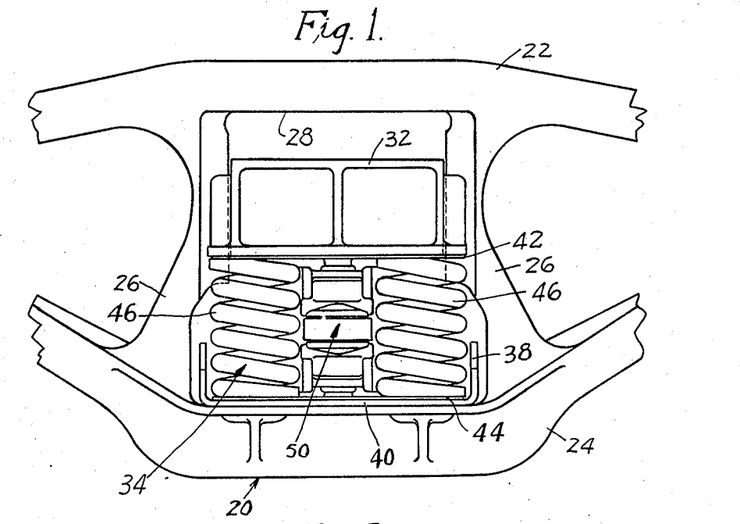
Figure 1 is a fragmentary side elevation of a truck construction embodying the invention.
Figure 2:
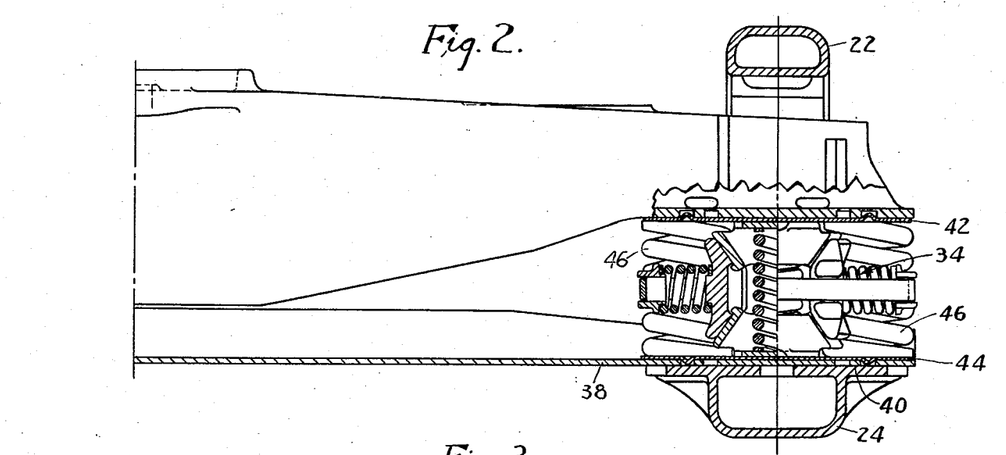
Figure 2 is a transverse elevation of the truck construction shown in Figure 1, the section being taken substantially on the transverse center line of the truck with only the left half of the snubbing device being shown in section, the other half being in elevation.
Figure 3:
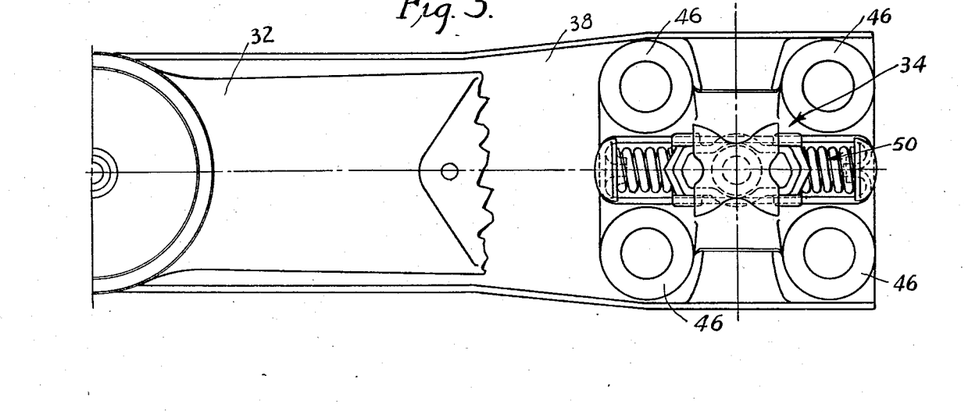
Figure 3 is a fragmentary top plan view of the truck construction shown in Figures 1 and 2, a portion of the bolster being cut away and a top spring cap removed to show the spring group arrangement thereunder.

Referring now more particularly to the structures shown in Figures 1, 2 and 3, the side frame, generally indicated at 20, is of the truss type having the compression member 22 and the tension member 24 joined by the column guides 26 and forming therewith the window opening 28 within which may be received the end of the bolster 32 in the usual manner. The bolster end is supported upon the spring assembly, generally indicated at 34, and the spring assembly is seated on the spring plank 38 which rests upon the spring seat portion 40 of the side frame in the usual manner.

The spring assembly, generally indicated at 34, may consist of the top spring plate 42 and the bottom spring plate 44 between which are received the usual coil springs 46 and the friction absorbing device, generally indicated at 50, the details of which will be more fully described as we proceed.

Figure 4:
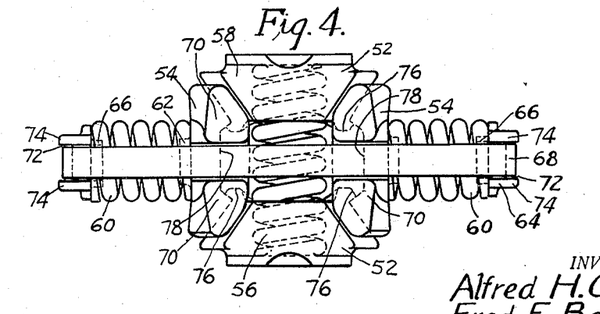
Figure 4 is an enlarged view in side elevation of the snubber shown in the truck construction of Figure 1 embodying one form of our invention.
Figure 5:
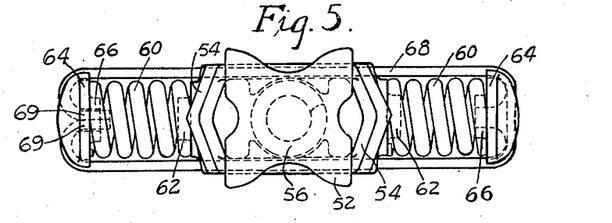
Figure 5 is a top plan view of the snubber shown in Figure 4.
Figure 6:
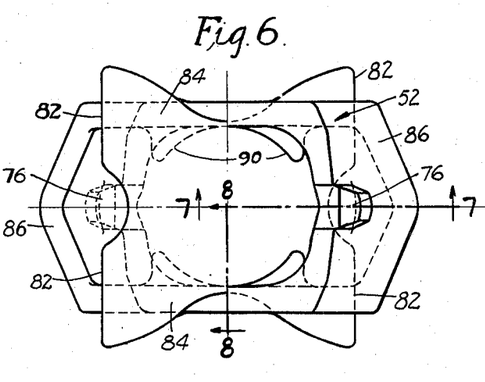
Figure 6 is a plan view of one of the follower wedges of the device shown in Figure 4, the left half of the figure showing the top plan and the right half of the figure indicating the bottom plan.

In Figures 4 and 5 we have shown enlarged views of the friction absorbing or snubbing device, generally indicated at 50, and forming a part of the spring assembly generally indicated at 34; and in Figures 6 to 17, inclusive, we have shown various details of the parts of this snubbing device.

Referring more particularly to Figures 4 and 5, our friction absorbing device may consist of an assembly having top and bottom follower wedges 52, identical in form, side wedges 54, also identical in form; the internal vertically arranged expanding coil spring 56, the ends of which are respectively received within the internal pockets or cavities 58 of the top and bottom follower wedges 52; the transversely arranged end springs 60, identical in form, their inner ends abutting against the outer faces of the side wedges 54 and positioned thereagainst over the lugs 62 formed on the said faces, and their outer ends abutting against the inner faces of the spring caps 64, also identical in form, the said springs being properly positioned against the said internal faces of the spring caps 64 by means of the positioning lugs 66 formed thereon, and finally the yoke 68 which encircles the snubber and retains the parts in assembly.

In assembly the yoke is held in position between the guiding lugs 70, formed on the side wedges, and each end of the yoke is received within the channel 72, formed by the arcuate flanges 74 on the outer ends of the spring caps 64.

Figures 14, 15, 16, 17, 18:
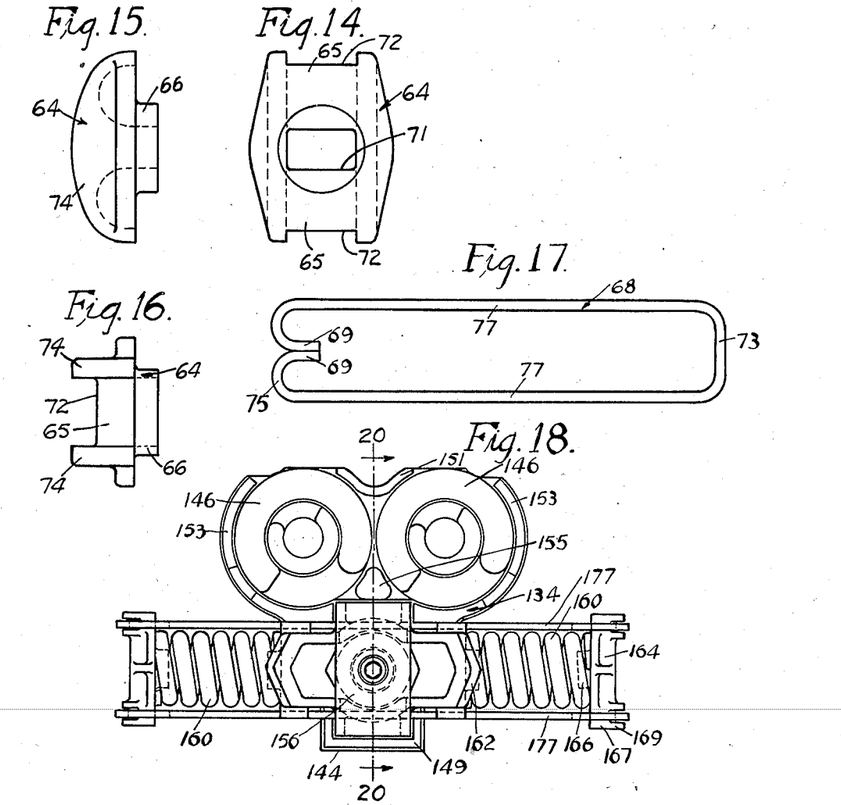
Figure 14 is a plan view of the spring cap viewed from the face which abuts against the spring.
Figure 15 is a top plan view of the spring cap shown in Figure 14.
Figure 16 is a side elevation of the spring cap shown in Figures 14 and 15.
Figure 17 is a top plan view of the yoke shown in the snubber assembly of Figures 4 and 5.
Figure 18 is a top plan view of another form of spring assembly embodying the invention, the assembly being shown with the top spring plate removed.

It will be observed that the yoke 68 is formed of a single strap of metal folded into an elongated U-shape with the free ends 69 doubled inwardly and received within the rectangularly shaped central opening 71 of the spring cap 64 (Figure 14). It will be understood, of course, that the yoke might be welded together in a link form without any free end, but the form shown is the least expansive in that it involves no welding.

In assembly the side wedges 54 may be placed in position within the yoke while one end of the yoke is still free to be spread. The spring caps 64 are then positioned within the ends of the yoke, the free ends of the yoke being now held in position by association with the spring cap. The transverse coils 60 may then be assembled between the side wedges and their respectively opposed spring caps. The vertical spring 56 may then be placed in position between the two side wedges and its ends received within the pockets or cavities 58 of the opposed top and bottom follower wedges 52 as these are placed in position. With the parts thus arranged, the whole may be placed in position under a press and force applied to compress the spring 56 as the follower wedges 52 are forced toward each other and the side wedges 54 are expanded outwardly. When the follower wedges have been forced toward each other until they reach their normal position (Figure 4) the lugs 76 on the follower wedges will be received within the slots 78 formed on the inner faces of the side wedges. All the parts will then be retained in assembly since all the springs will be under compression and the lugs 76 abutting against the ends of the slots 78 will retain the wedges in assembled relation.

The follower wedge 52 is shown in more detail in Figures 6 to 9, inclusive. Its outer wall 80 may be generally rectangular in plan defined at each end by the substantially parallel edges 82 which may be seated within a corresponding depression in the spring plate of the spring assembly similarly to the arrangement shown in Figures 18 to 24, inclusive. It will be understood, of course, that the contour of this face and the depression within which it is received may be any convenient shape. The side walls 84 are substantially parallel and together with the end walls 86 form the cavity 58 within which may be received one end of the spring 56. When the device is assembled the spring may be received within the pocket or cavity 58 and held in position against the abutments 90 formed integrally with the top wall and side walls, or the walls 84 may be made to conform in shape to the contour of the spring itself. It will be observed that the end walls 86 are V-shaped in section, as clearly shown in Figure 9, with the vertex of the V pointing outwardly, and that these walls 86 slant inwardly toward each other. The faces 92 thus formed on the end walls provide friction surfaces which cooperate with opposing faces on the side wedges hereinafter described.

The retaining lugs 76 are formed at the inward extremities of the walls 86 and at the vertex of the V-shaped portion for the purpose already described.

Figure 7:
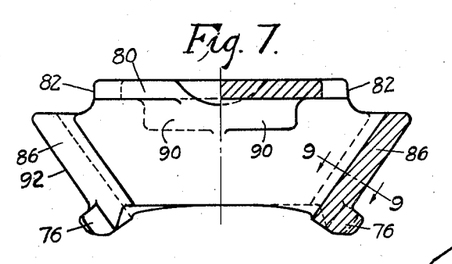
Figure 7 is an elevational view of the follower wedge shown in Figure 6, the right half of the figure showing a section, said section being taken substantially in the plane indicated by the line 7—7 of Figure 6.
Figure 8:
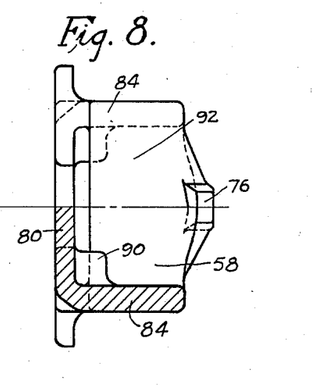
Figure 8 is an end of the follower wedge shown in Figure 6, partly in section, the section being taken substantially in the plane indicated by the line 8—8 of Figure 6.
Figure 9:
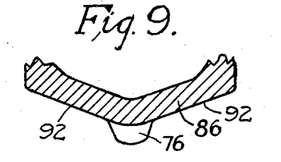
Figure 9 is a sectional view through the follower wedge shown in Figures 6, 7 and 8, the section being taken substantially in the plane indicated by the line 9—9 of Figure 7.

The side wedge generally indicated at 54 is shown in more detail in Figures 10 to 13, inclusive. It may be generally described as a solid block of metal more or less rectangular in plan having the outer substantially flat face 93 with the centrally located spring positioning boss or lug 62 and the yoke receiving channels or slots 96 at each side. The inner surface of the side wedge consists of two V-shaped faces 98 converging inwardly and of a form complementary to that of the outward faces 92 on the follower blocks 52 (Figures 7 and 9). These faces 98 form friction surfaces for engagement with the friction surfaces 92 on the follower wedges. The elongated slot or pocket 78 is centrally formed on the inner face of the wedge block 54 for the reception of the lugs 76 on the follower blocks. The ends of slot 78 form a stop against which lugs 76 seat thus interlocking the follower wedges with the side wedges and maintaining a secure assembly of all of the snubber parts when removed from the truck or released of load.

The spring cap 64 is shown in more detail in Figures 14 to 16, inclusive. It consists of the top and bottom arcuate flanges 74 joined by the post-like members 65, half cylindrical in form, thus providing the channels 72 and the rectangular opening 71 within which may be received the free ends 69 of the yoke 68 as previously described (Figure 5). These free ends 69 are arcuate in form thus fitting snugly around the post-like members 65. The spring abutting face of the spring cap is provided with the spring positioning lug 66 and the manner in which this part is received within the assembly is clearly shown in Figures 4 and 5.

Figure 10:
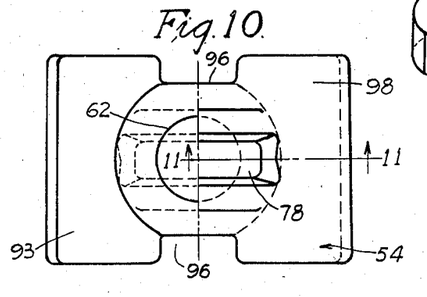
Figure 10 is a plan view of one of the side wedges of the device shown in Figure 4, the left half of the figure showing the bottom plan and the right half of the figure indicating the top plan.
Figure 11:
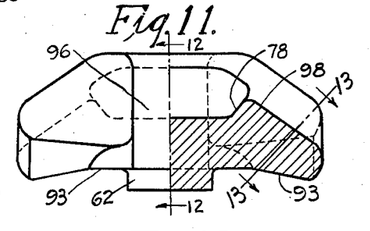
Figure 11 is a side elevation of the side wedge shown in Figure 10 partly in section, the section being taken substantially in the plane indicated by the line 11—11 of Figure 10.
Figure 12:
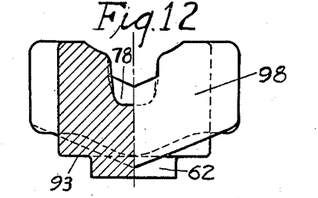
Figure 12 is an end view partly in section of the side wedge shown in Figures 10 and 11, the section being taken substantially in the plane indicated by the line 12—12 of Figure 11.
Figure 13:
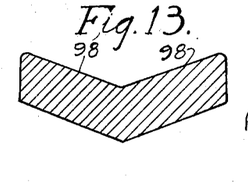
Figure 13 is a sectional view of the side wedge shown in Figures 10 and 11, the section being taken substantially in the plane indicated by the line 13—13 of Figure 11.

Figure 17 shows the form of yoke which is used in the assemblies described in Figures 1 to 5, inclusive. It consists of a strap of metal formed into a generally elongated U-shape with the free ends 69 doubled inwardly for reception within the rectangular slot 71 (Figure 14) formed within the spring cap 64. It will be understood, of course, that this yoke may be formed as a simple link with both ends closed as shown at 73 or it may be formed in two separate straps having both ends of the form shown at 75. In either case the end portions of the yoke 68 will be received within the channels 72 formed on the spring caps 64 and likewise the side straps 77 will be received within the channels or slots 96 formed on the edges of the side wedges 54 (Figure 10).

Figure 19:
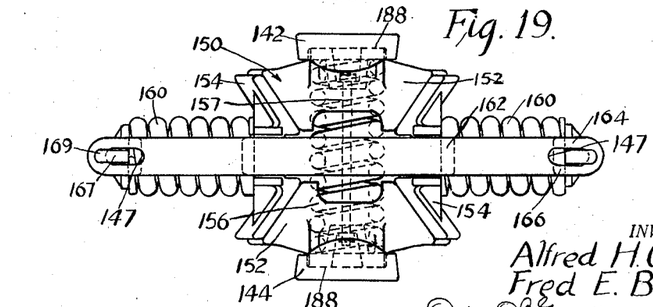
Figure 19 is a view in side elevation of the spring assembly shown in Figure 18.
Figure 20:
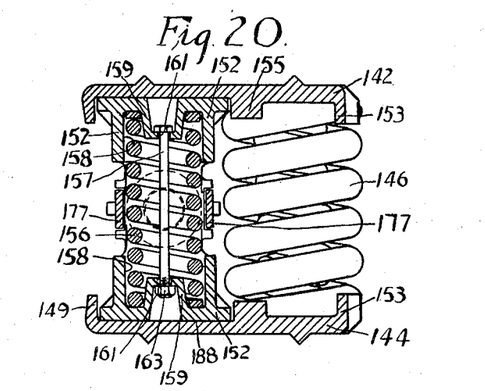
Figure 20 is a sectional view of the spring assembly shown in Figures 18 and 19, the section being taken substantially in the plane indicated by the line 20—20 of Figure 18.

Figures 18, 19 and 20 show another modification of the invention in which the spring assembly generally indicated at 134 may be of a non-symmetrical form and may consist of the top spring plate 142 and the bottom spring plate 144 between which may be received the usual coil springs 146 and the friction absorbing device generally indicated at 150. The friction absorbing device is substantially like the friction absorbing device 50 previously described with differences in detail which will appear as the description proceeds. For convenience of illustration Figure 18 is shown with the top spring plate removed. The spring plates have arcuate positioning flanges 151 and 153 for the coil springs and the upstanding positioning lug 155 intermediate the two coil springs. The spring caps are likewise provided with a rectangularly shaped depressed portion conforming in shape to the outer faces 188 of the follower wedges 152 of the friction absorbing device 150, said depressed portion being defined by the rectangular flange 149.

The friction absorbing device 150 differs from that previously described in that the follower wedges 152 are held in cooperative relation with each other and with the side wedges 154 by means of the bolt 157, the head of said bolt being received with the hollow boss 159 centrally formed within the follower member 152. The bolt 157 passes through the opening 161 of the boss 159 and extends through the corresponding opening 161 of the corresponding boss 159 on the opposed follower member 152, being secured therein by the associated threaded nut 163. The internal vertically arranged expanding coil spring 156 is positioned between the two follower wedges 152 around the bosses 159 and within the internal pockets 158 of the follower wedge members 152. The side wedges 154 are substantially similar to the side wedges 54 and the transversely arranged end springs 160 are positioned between the bosses or lugs 162 and 166 formed respectively on the side wedge 154 and the spring cap 164. In this embodiment the yoke is formed of separate side straps 177 having the eye ends 147 within which may be received the elongated lugs 167 formed on the spring caps, said lugs being provided with the overhanging lip or extended portion 169 which prevents the accidental removal of the yoke straps after assembly.

Figure 21:
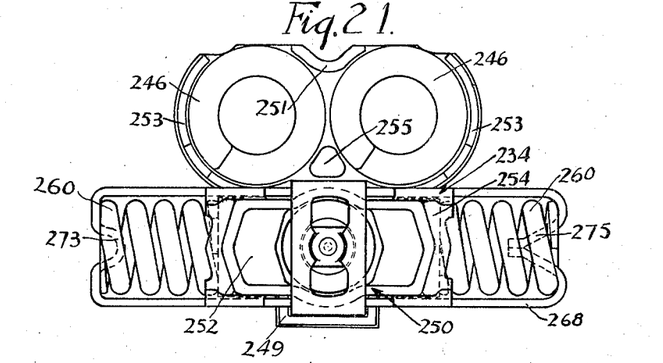
Figure 21 is a top plan view of another spring assembly embodying the invention, the assembly being shown with the top spring plate removed.

Figure 21 shows a further embodiment of the invention in a non-symmetrical arrangement similar to that shown in Figure 18 in which the spring assembly generally indicated at 234 consists of the top spring cap 242, and the bottom spring cap 244, between which are received the coil springs 246, said springs being secured in position by the arcuate flanges 251 and 253 and the up-standing lug 255 in a manner previously described for Figure 18. In this embodiment the friction absorbing device generally indicated at 250 is positioned between the spring caps in depressions formed therein, said depressions being defined by the flanges 249. In this embodiment, however, the spring caps are omitted from the friction device which consists of the top and bottom follower wedges 252, the side wedges 254 and the internal expanding coil spring 256 mounted within the pockets of the follower wedges and secured therein by the bolt 257 in the manner previously described for the structure shown in Figures 18 to 20, inclusive; also the transversely arranged end springs 260 which are positioned between the ends of the yoke 268 and the oppositely disposed side wedges 254. In this case the spring caps have been omitted and the yoke is formed at its closed end with the inwardly projecting loop portion 273 which serves to position the spring 260, and at the opposite end of the yoke the free ends are doubled inwardly between the coils of the spring 260 as shown at 275.

Figure 22:
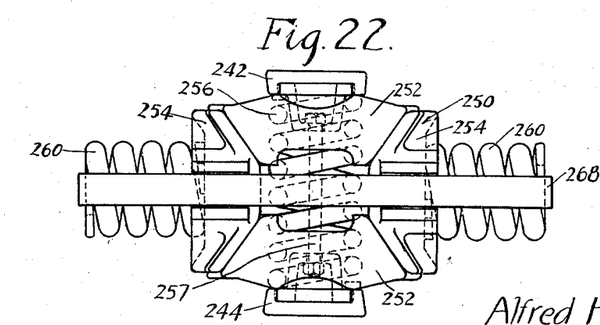
Figure 22 is a side elevation of the structure shown in Figure 21.
Figure 23:
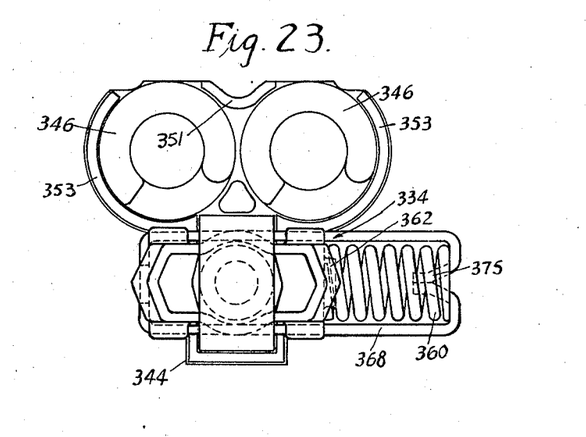
Figure 23 is a top plan view of still another spring assembly embodying the invention, the assembly being shown with the top spring plate removed.
Figure 24:
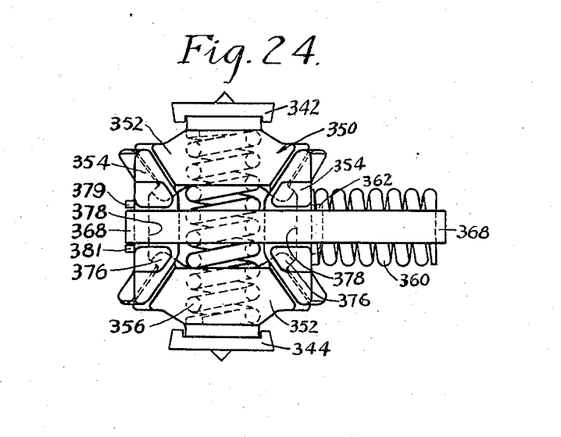
Figure 24 is a side elevation of the spring assembly shown in Figure 23.

The embodiment of the invention shown in Figures 23 and 24 shows a structure very similar to that of Figures 21 and 22 except that the friction device has a single transversely arranged spring instead of the two disclosed in other embodiments. In the structure now being described the spring assembly generally indicated at 334 may consist of the top spring plate 342 and the bottom spring plate 344 between which are secured the coil springs 346, said springs being positioned by the arcuate flanges 351 and 353 as well as by the upstanding lug 355 in a manner similar to those structures already described. The associated friction absorbing device generally indicated at 350 may consist of the top and bottom follower wedges 352, the internal expanding coil spring 356, the side wedges 354, the single transversely arranged end spring 360 and the yoke 368. In this embodiment the follower wedges are prevented from displacement when the parts are maintained in assembly by the lugs 376 which are received within the elongated pockets or slots 378 formed on the inner faces of the side wedges 354. This retaining feature is the same as that previously described for Figure 4. This construction, however, differs from those previously described in that the side wedge shown at the left as viewed in Figure 24 is provided with the top and bottom flanges 379 and 381 defining a channel therebetween within which is received the closed end of the yoke 368. The free ends of the yoke are doubled inwardly around the outer end of the spring 360 as shown at 375, said spring 360 being positioned between this end of the yoke and the opposed face of the other side wedge and being positioned thereagainst around the lug 362.

It is apparent, of course, that, with the type of structure which we have shown, it will be possible to vary the amount of frictional absorption as, for example, by modifying the angles at which the V-shaped faces 92 on the follower wedges cooperate with the V-shaped faces 98 on the side wedges. It is clear, also, that we may modify the areas of these faces to suit the particular conditions. It is also possible to modify the amount of frictional absorption by changing the materials from which the wedge blocks or the follower blocks are made up.

It will be apparent, also, that we may modify the form of this snubber and its operation by providing two or more internal springs instead of the single coil spring 56, although the use of a single spring has the advantage of simplicity and economy under most operating conditions.

It is to be understood that we do not wish to be limited by the exact embodiments of the device shown which are merely by way of illustration and not limitation, as various and other forms of the device will of course be apparent to those skilled in the art without departing from the spirit of the invention or the scope of the claims.

We claim:

1. A self-contained friction device comprising top and bottom follower wedges in the form of housings, each of said housings having an outer wall comprising seating means, cylindrical side walls and tapering end walls and an open end opposite said outer wall, a pair of side wedges having friction surfaces cooperating with said follower wedges, means on the inner edges of said end walls cooperating with slots on the inner faces of said side wedges to retain said followers in assembled relationship, a coil spring housed within said follower wedges and operable to release said wedges after compression, a plurality of coil springs having their axes substantially at right angles to the first mentioned spring and operable by said side wedges, and yoke means surrounding said wedges and said last mentioned springs and acting as retaining means therefor.

2. A friction absorbing device comprising top and bottom followers, slotted side wedges having friction surfaces cooperating with friction surfaces on said followers, lugs on the inner edges of said followers cooperating with the slots in said wedges to retain said followers in assembly, a coil spring housed within said followers, a yoke, and resilient means interposed between said yoke and said wedges, each of said followers comprising a housing having cylindrical side walls, V-shaped tapering end walls and an outer wall joining said side walls, said outer wall having seating means on its inner and outer faces.

3. A friction absorbing device comprising top and bottom followers, slotted side wedges having friction surfaces cooperating with said followers, a coil spring housed within said followers, a yoke, resilient means interposed between each end of said yoke and one of said wedges, each of said followers being in the form of a housing having an outer wall with seating means, cylindrical side walls, and tapering frictional end walls terminating at the open end of said housing.

4. A friction absorbing device comprising top and bottom followers in the form of housings, resilient means housed therein, slotted wedges having friction surfaces cooperating with said followers, yoke means, resilient means interposed between said wedges and said yoke, each of said housings comprising an outer wall, cylindrical side walls and V-shaped tapering end walls, an open end opposite said outer wall, and means at the opposite edges of said open end cooperating with the slots in said side wedges to retain said housings in assembled relationship.

5. A friction absorbing device comprising top and bottom followers, a coil spring housed therein, side wedges having friction surfaces cooperating with said followers and having means to retain said followers in operative position, a horizontal yoke, and resilient means between one of said wedges and said yoke, said wedges having positioning means for the reception of said yoke, said yoke having fixed cooperation with one of said wedges.

6. A friction absorbing device comprising top and bottom followers, a coil spring housed therein, side wedges each having friction surfaces cooperating with said followers and having a slot cooperating with lugs on said followers to retain the latter in operative position, a horizontal yoke, and resilient means between one of said wedges and said yoke, said wedges having positioning means for the reception of said yoke, said yoke having sliding cooperation with one of said wedges.

7. A friction absorbing device comprising top and bottom followers, a coil spring housed therein, side wedges having friction surfaces cooperating with said followers and having means to retain said followers in operative position, a horizontal yoke, and resilient means between one of said wedges and said yoke, said wedges having positioning means for the reception of said yoke, said yoke having sliding cooperation with respect to one of said wedges and non-sliding cooperation with respect to the other of said wedges.

8. A friction absorbing device comprising follower housings having outer walls forming seating means, cylindrical side walls and tapering end walls with V-shaped friction surfaces, said housing presenting an open end opposite said outer wall, a coil spring interposed between each of said wedges and one end of said yoke, slots in said wedges, and lugs on said followers having cooperation with said slots to limit the movement of said followers and to retain said followers in assembly.

9. A friction absorbing device comprising a follower housing having an outer wall comprising a spring seat, side walls, tapering end walls with V-shaped friction surfaces, each of said housings presenting an open end opposite said spring seat, a coil spring housed within said follower, wedges having V-shaped friction surfaces cooperating with said first named surfaces, a yoke, spring means interposed between each of said wedges and one end of said yoke, slots on the inner faces of said wedges, and lugs on said followers at the open ends thereof cooperating with said slots to limit the movement of said followers and to retain said followers in assembled relationship.

10. A friction absorbing device comprising follower wedges, resilient means housed within said follower wedges, side wedges cooperable with said follower wedges along V-shaped friction surfaces, said side wedges having means cooperating with means on said follower wedges to retain said follower wedges in assembly, a retaining yoke, and resilient means between one of said side wedges and said yoke, said side wedges having positioning slots for said yoke, said yoke having sliding cooperation with one of said wedges and non-sliding cooperation with another of said wedges.

11. A self-contained friction shock absorbing device comprising similar top and bottom followers in the form of integrally cast housings having seating means on their outer walls, V-shaped end faces, side walls and an open end opposite said seating means, side wedges having V-shaped surfaces cooperating with said faces and having means cooperating with means on the inner edges of said followers to retain the latter in assembled relationship, a coil spring housed within said followers and abutting said end walls, a yoke, and resilient means interposed between said yoke and said wedges.

12. A self-contained friction absorbing device comprising identical followers in the form of spring housings having seating means on their outer walls, tapering frictional end walls, cylindrical side walls and open ends opposite said outer walls, side wedges having centrally formed slots on their inner faces, means on the open ends of said followers cooperating with said slots to retain said followers in assembly, resilient means within said housings, a yoke, and other resilient means between said wedges and said yoke.

13. A friction absorbing device comprising identical spring housing followers having outer walls forming seating means, side walls, frictional end walls, an open end opposite said outer wall, side wedges having means cooperating with means at the open ends of said followers to retain the latter in operative position and having frictional surfaces cooperating with said end walls, resilient means within said housings, a yoke, and other resilient means between one of said wedges and said yoke.

14. A friction absorbing mechanism comprising top and bottom followers in the form of integral housings each having outer walls forming seating means, cylindrical side walls, V-shaped frictional end walls and open ends opposite said outer walls, side wedges having means cooperating with means at the open ends of said followers to retain the latter in assembled relationship and having complementary friction faces engaging said end walls, resilient means housed within said followers, a retaining yoke, and other resilient means interposed between said yoke and said side wedges.

15. In a friction device a vertical load supporting coil spring, followers in the form of housings enclosing the opposite ends of said spring, said housings having outer walls forming seating means for said device and seating means for said spring, side walls and V-shaped tapering end walls presenting a circular open end opposite said outer wall, slotted side wedges having V-shaped tapering faces cooperating with said end walls, means at the open ends of said followers cooperating with means on said wedges to retain said followers in assembled relationship, yoke means, and resilient means interposed between said side wedges and said yoke means.

16. In a friction device a vertically arranged load supporting coil spring, top and bottom follower housings enclosing the ends of said spring, each of said housings comprising an outer wall forming seating means for said device and for said spring, side walls and V-shaped end walls tapering to the open end of said housing, side wedges cooperating with said tapering walls, means at the open end of said housings cooperating with means on said wedges to retain said housings in assembled relationship, a yoke, and resilient means between said yoke and each of said wedges.

17. In a friction device a vertically arranged load supporting coil spring, top and bottom followers in the form of housings having outer walls forming seating means for said spring and for said device, side walls and V-shaped end walls tapering to the open end of said housing opposite said outer wall, side wedges having faces cooperating with said end walls, lugs at the open ends of said housings cooperating with slots on said wedges to retain said housings in assembled relationship, a horizontal yoke surrounding said device, and resilient means between each of said wedges and said yoke.

ALFRED H. OELKERS.
FRED E. BACHMAN.